US012574894B2

(12) United States Patent
Barbu et al.

(10) Patent No.: US 12,574,894 B2
(45) Date of Patent: Mar. 10, 2026

(54) SIGNALLING FRAMEWORK FOR VIRTUAL TRANSMISSION-RECEPTION POINT LOCALIZATION IN WIRELESS NETWORKS

(71) Applicant: Nokia Technologies Oy, Espoo (FI)

(72) Inventors: Oana-Elena Barbu, Aalborg (DK); Diomidis Michalopoulos, Munich (DE); Benny Vejlgaard, Gistrup (DK); Mikko Saily, Laukkoski (FI)

(73) Assignee: Nokia Technologies Oy, Espoo (FI)

( * ) Notice: Subject to any disclaimer, the term of this patent is extended or adjusted under 35 U.S.C. 154(b) by 442 days.

(21) Appl. No.: 18/270,964

(22) PCT Filed: Oct. 18, 2021

(86) PCT No.: PCT/EP2021/078771
§ 371 (c)(1),
(2) Date: Jul. 5, 2023

(87) PCT Pub. No.: WO2022/152414
PCT Pub. Date: Jul. 21, 2022

(65) Prior Publication Data
US 2024/0057019 A1    Feb. 15, 2024

(30) Foreign Application Priority Data

Jan. 13, 2021    (FI) ...................................... 20215034

(51) Int. Cl.
*H04W 4/00*        (2018.01)
*G01S 5/00*         (2006.01)
        (Continued)

(52) U.S. Cl.
CPC ......... *H04W 64/003* (2013.01); *G01S 5/0036* (2013.01); *G01S 5/011* (2020.05);
        (Continued)

(58) Field of Classification Search
None
See application file for complete search history.

(56) References Cited

U.S. PATENT DOCUMENTS

2021/0185632 A1 * 6/2021 Manolakos ......... H04W 64/003
2021/0360461 A1 * 11/2021 Duan ...................... G01S 7/006

FOREIGN PATENT DOCUMENTS

WO    WO-2019016987 A1 *  1/2019 ........... H04L 5/0073
WO    WO-2020028517 A1 *  2/2020 .............. G01S 5/10

OTHER PUBLICATIONS

Deng, Z. et al., "A TDOA and PDR Fusion Method for 5G Indoor Localization Based on Virtual Base Stations in Unknown Areas," IEEE Access, vol. 8, Dec. 14, 2020, pp. 225123-225133.
(Continued)

*Primary Examiner* — Zewdu A Beyen
(74) *Attorney, Agent, or Firm* — Lippes Mathias LLP

(57)        ABSTRACT
There are provided apparatuses, methods and computer program products. In accordance with an embodiment, there is disclosed a method including receiving from one or more user equipment an indication that the user equipment is capable to report information about a virtual transmission reception point related to a wireless communication system; configuring a measurement resource set for virtual transmission reception point; informing the one or more user equipment about the measurement resource set; receiving from the one or more user equipment an enhanced measurement report containing measurements of signals received from one or more transmission reception points and virtual transmission reception points; combining several enhanced measurement reports received from one or more user equipment; and estimating locations of the one or more virtual transmission reception points on the basis of the combined enhanced measurement reports.

17 Claims, 6 Drawing Sheets

(51) Int. Cl.
  *G01S 5/02* (2010.01)
  *H04L 5/00* (2006.01)
  *H04W 64/00* (2009.01)

(52) U.S. Cl.
  CPC .......... *G01S 5/0273* (2013.01); *H04L 5/0035* (2013.01); *H04L 5/0048* (2013.01)

(56) References Cited

OTHER PUBLICATIONS

Chen, C. et al., "Wireless Location Estimation with the Assistance of Virtual Base Stations," IEEE Transactions on Vehicular Technology, vol. 58, No. 1, Jan. 16, 2009, pp. 93-106.

Fraunhofer IIS et al., "Potential positioning enhancements," 3GPP TSG RAN WG1 Meeting #103-e, R1-2008841, Oct. 26-Nov. 13, 2020.

Nokia et al., "Views on potential positioning enhancements," 3GPP TSG RAN WG1 #103-e, R1-2008301, Oct. 16, 2020.

Moderator (Ericsson), "FL summary #2 for AI 8.5.3 Accuracy improvements for DL-AoD positioning," 3GPP TSG-RAN WG1 Meeting #105-e, R1-2106144, May 10-27, 2021.

* cited by examiner

Step 3: EPR generation

UE

*if* |vAOA-AOAnlos|<threshold
Merge DL-PRS meas. with
V-TRP meas.
Generate EPR
*End*

Step 2: V-TRP measurements

UE vAOA=AOAnlos

V-TRP-
beacon vTRP

TRP

Step 1: DL-PRS measurements

UE

AOAnlos

DL-PRS vTRP

TRP

SIGNALLING FRAMEWORK FOR VIRTUAL TRANSMISSION-RECEPTION POINT LOCALIZATION IN WIRELESS NETWORKS

CROSS REFERENCE TO RELATED APPLICATION

This patent application is a U.S. National Stage application of International Patent Application Number PCT/EP2021/078771 filed Oct. 18, 2021, which is hereby incorporated by reference in its entirety, and claims priority to FI 20215034 filed Jan. 13, 2021.

TECHNICAL FIELD

The present invention relates to a method and apparatus for signalling framework for virtual transmission-reception point localization.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. 5G supports 5G NR positioning, specifically network-based positioning, where the calculation of the location estimate of a mobile communication device, which may also be called as a user equipment (UE), is carried out at the network, at a location management function (LMF).

A special aspect of positioning in multipath propagation environments is that multiple signal paths can be used in estimating UE's location. However, the use of multiple paths is not trivial, since they are associated with reflections generated by landmarks with unknown locations. If the locations of such landmarks are obtained then the network may be able to successfully employ multipath measurement reports in refining the UE position beyond what the standard time-of-arrival/angle-of-arrival (TOA/AOA) methods can produce.

Using all multipath components that a UE detects may be beneficial for enhancing the estimation accuracy, yet that would require known location of the reflectors causing the multipath. Since these reflectors are acting as signal sources, they can be called as virtual transmission-reception points (virtual TRPs, V-TRP). In this situation, the network can treat the reflector as an additional signal source and use it in the localization process as an additional reference point.

Some positioning procedures are dependent on line-of-sight (LoS) paths, such that if the LoS path is severely attenuated due to, e.g., an unexpected obstacle obstructing the LoS, then the positioning accuracy will degrade unless that transmission point is dropped from the position calculation.

This may be problematic in situations where there are not sufficiently many TRPs to provide positioning reference signals (PRS), such that the overall integrity of the positioning system reduces. From another viewpoint, there is no robustness against sudden loss of LoS component considered, such as a fall-back mechanism which would allow the positioning system to operate in a decent level of accuracy even in case the LoS component from at least one TRPs is lost.

Therefore, a mechanism to improve the reliability and accuracy of location applications.

SUMMARY

Some embodiments provide a method and apparatus for signalling framework for virtual transmission-reception point localization.

Some embodiments are implemented in the context of the 5G communication systems and provide a signalling framework that enables the network to generate a map with the locations of some or all virtual TRPs (V-TRP) nearby as a by-product of the UE positioning procedure. Once localized, the V-TRPs may be used to enhance the positioning accuracy by exploiting multipath information.

In accordance with an embodiment, the UE signals to the LMF its capability of becoming a reference UE, i.e. the capability of reporting V-TRP information. The LMF responds back by selecting the UE as a reference and configuring a V-TRP measurement resource set (V-TRP-MR). The LMF signals power control settings for the V-TRP signal transmission by the UE. The LMF may also signal a selected signature (i.e. a generating code) for the V-TRP signal, so that it ensures its uniqueness in the UE vicinity. The LMF and the UE perform the positioning session including session setup, uplink/downlink positioning reference signal (UL/DL PRS) transmission and detection. The UE activates the V-TRP measurement mode for a certain time period and sends the V-TRP-beacon. The UE listens in certain number of slots for the reflected signal and measures time-of-arrival, angle-of-arrival, received signal received power (RSRP), etc. Then, the UE merges the V-TRP measurements with the PRS measurements by common set of features, e.g. AOA and appends the result to the positioning report. The LMF receives an enhanced measurement report (EPR) containing measurements of all relevant TRP and V-TRP measurements and combines the EPRs collected from several reference UEs and estimates the V-TRP locations.

According to a first aspect there is provided a network element comprising:
- means for receiving from one or more user equipment an indication that the user equipment is capable to report information about a virtual transmission reception point related to a wireless communication system;
- means for configuring a measurement resource set for virtual transmission reception point;
- means for informing the one or more user equipment about the measurement resource set;
- means for receiving from the one or more user equipment an enhanced measurement report containing measurements of signals received from one or more transmission reception points and virtual transmission reception points;
- means for combining several enhanced measurement reports received from one or more user equipment; and
- means for estimating locations of the one or more virtual transmission reception points on the basis of the combined enhanced measurement reports.

According to a second aspect there is provided a method comprising:

receiving from one or more user equipment an indication that the user equipment is capable to report information about a virtual transmission reception point related to a wireless communication system;

configuring a measurement resource set for virtual transmission reception point;

informing the one or more user equipment about the measurement resource set;

receiving from the one or more user equipment an enhanced measurement report containing measurements of signals received from one or more transmission reception points and virtual transmission reception points;

combining several enhanced measurement reports received from one or more user equipment; and estimating locations of the one or more virtual transmission reception points on the basis of the combined enhanced measurement reports.

According to a third aspect there is provided an apparatus comprising at least one processor; and at least one memory including computer program code the at least one memory and the computer program code configured to, with the at least one processor, cause the apparatus to perform at least the following:

receive from one or more user equipment an indication that the user equipment is capable to report information about a virtual transmission reception point related to a wireless communication system;

configure a measurement resource set for virtual transmission reception point;

inform the one or more user equipment about the measurement resource set;

receive from the one or more user equipment an enhanced measurement report containing measurements of signals received from one or more transmission reception points and virtual transmission reception points;

combine several enhanced measurement reports received from one or more user equipment; and estimate locations of the one or more virtual transmission reception points on the basis of the combined enhanced measurement reports.

According to a fourth aspect there is provided an apparatus comprising:

a first circuitry configured to receive from one or more user equipment an indication that the user equipment is capable to report information about a virtual transmission reception point related to a wireless communication system;

a second circuitry configured to inform the one or more user equipment about the measurement resource set;

a third circuitry configured to receive from the one or more user equipment an enhanced measurement report containing measurements of signals received from one or more transmission reception points and virtual transmission reception points;

a fourth circuitry configured to combine several enhanced measurement reports received from one or more user equipment; and a fifth circuitry configured to estimate locations of the one or more virtual transmission reception points on the basis of the combined enhanced measurement reports.

According to a fifth aspect there is provided a computer program comprising computer readable program code which, when executed by at least one processor, cause the apparatus to perform at least the following:

receive from one or more user equipment an indication that the user equipment is capable to report information about a virtual transmission reception point related to a wireless communication system;

configure a measurement resource set for virtual transmission reception point;

inform the one or more user equipment about the measurement resource set;

receive from the one or more user equipment an enhanced measurement report containing measurements of one or more transmission reception points and virtual transmission reception points;

combine several enhanced measurement reports received from one or more user equipment; and estimate locations of the one or more virtual transmission reception points on the basis of the combined enhanced measurement reports.

According to a sixth aspect there is provided a user equipment comprising:

means for sending an indication to a network element that the user equipment is capable to report information about a virtual transmission reception point related to a wireless communication system;

means for receiving information about a measurement resource set from the network element;

means for detecting and measuring positioning reference signals transmitted by the network element;

means for generating a virtual transmission reception point beacon signal using the received information about the measurement resource set;

means for transmitting the virtual transmission reception point beacon signal during a time period determined in the measurement resource set;

means for listening for a reflected beacon signal;

means for measuring one or more properties of the reflected signal;

means for merging the measurement results with the positioning reference signal measurements;

means for generating a measurement report based on the merged measurement results; and means for transmitting the measurement report to the network element.

According to a seventh aspect there is provided a method comprising:

sending an indication to a network element that the user equipment is capable to report information about a virtual transmission reception point related to a wireless communication system;

receiving information about a measurement resource set from the network element;

detecting and measuring positioning reference signals transmitted by the network element;

generating a virtual transmission reception point beacon signal using the received information about the measurement resource set;

transmitting the virtual transmission reception point beacon signal during a time period determined in the measurement resource set;

listening for a reflected beacon signal;

measuring one or more properties of the reflected signal;

merging the measurement results with the positioning reference signal measurements;

generating a measurement report based on the merged measurement results; and transmitting the measurement report to the network element.

According to an eighth aspect there is provided an apparatus comprising at least one processor; and at least one memory including computer program code the at least one memory and the computer program code configured to, with the at least one processor, cause the apparatus to perform at least the following:

send an indication to a network element that the user equipment is capable to report information about a virtual transmission reception point related to a wireless communication system;

receive information about a measurement resource set from the network element;

detect and measuring positioning reference signals transmitted by the network element;

generate a virtual transmission reception point beacon signal using the received information about the measurement resource set;

transmit the virtual transmission reception point beacon signal during a time period determined in the measurement resource set;

listen for a reflected beacon signal;

measure one or more properties of the reflected signal;

merge the measurement results with the positioning reference signal measurements;

generate a measurement report based on the merged measurement results; and transmit the measurement report to the network element.

According to a ninth aspect there is provided a user equipment comprising:

a first circuitry configured to send an indication to a network element that the user equipment is capable to report information about a virtual transmission reception point related to a wireless communication system;

a second circuitry configured to receive information about a measurement resource set from the network element, and to detect positioning reference signals transmitted by the network element;

a third circuitry configured to measure the positioning reference signals;

a fourth circuitry configured to generate a virtual transmission reception point beacon signal using the received information about the measurement resource set;

wherein the first circuitry is further configured to transmit the virtual transmission reception point beacon signal during a time period determined in the measurement resource set;

the second circuitry is further configured to listen for a reflected beacon signal; and the third circuitry is further configured to measure one or more properties of the reflected signal;

wherein the user equipment further comprises:

a fifth circuitry configured to merge the measurement results with the positioning reference signal measurements and to generate a measurement report based on the merged measurement results; and wherein the first circuitry is further configured to transmit the measurement report to the network element.

According to a tenth aspect there is provided a computer program comprising computer readable program code which, when executed by at least one processor; cause the apparatus to perform at least the following:

send an indication to a network element that the user equipment is capable to report information about a virtual transmission reception point related to a wireless communication system;

receive information about a measurement resource set from the network element;

detect and measuring positioning reference signals transmitted by the network element;

generate a virtual transmission reception point beacon signal using the received information about the measurement resource set;

transmit the virtual transmission reception point beacon signal during a time period determined in the measurement resource set;

listen for a reflected beacon signal;

measure one or more properties of the reflected signal;

merge the measurement results with the positioning reference signal measurements;

generate a measurement report based on the merged measurement results; and transmit the measurement report to the network element.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME
EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
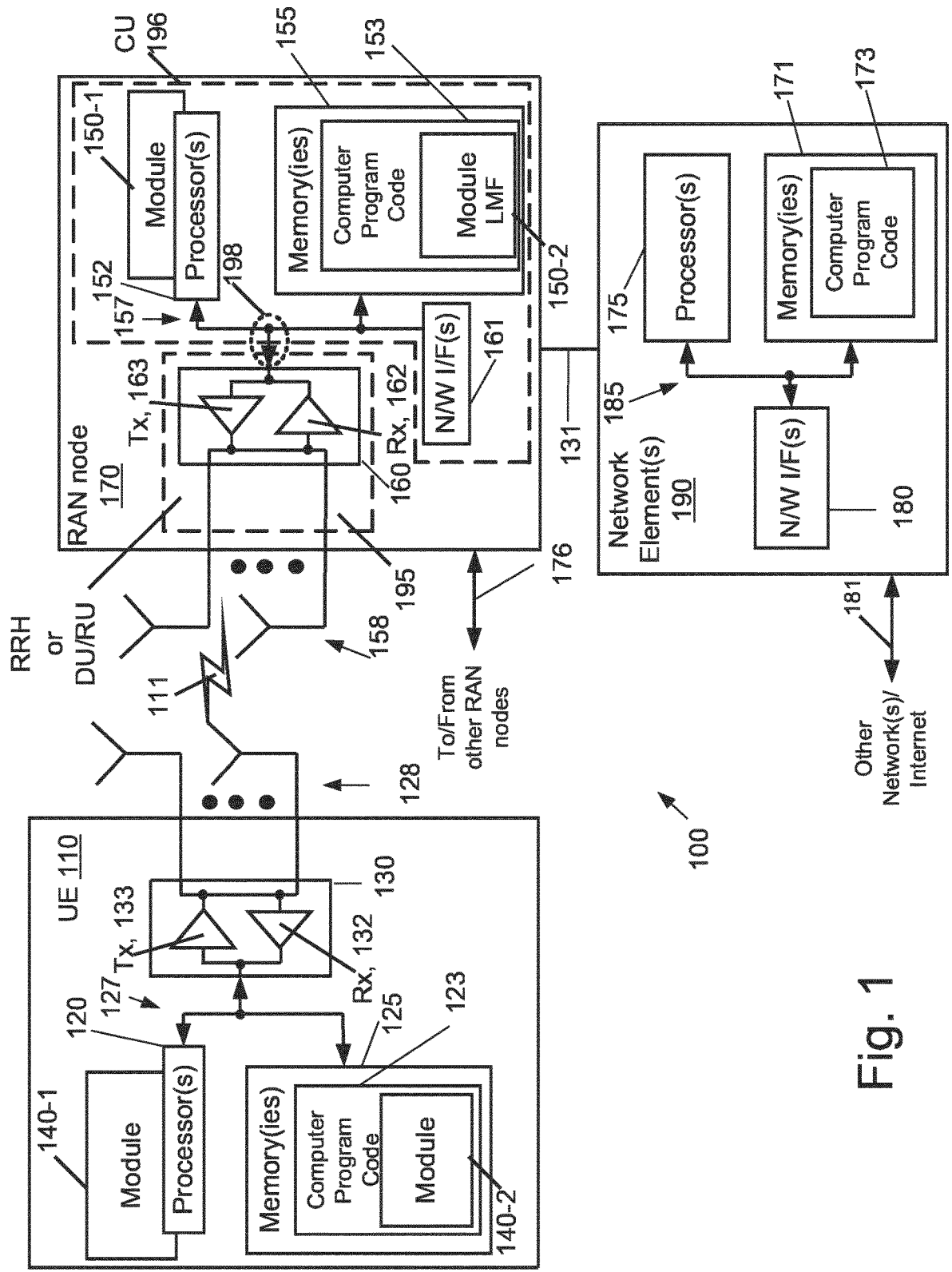
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated.

In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may also be implemented as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

Figure 2:
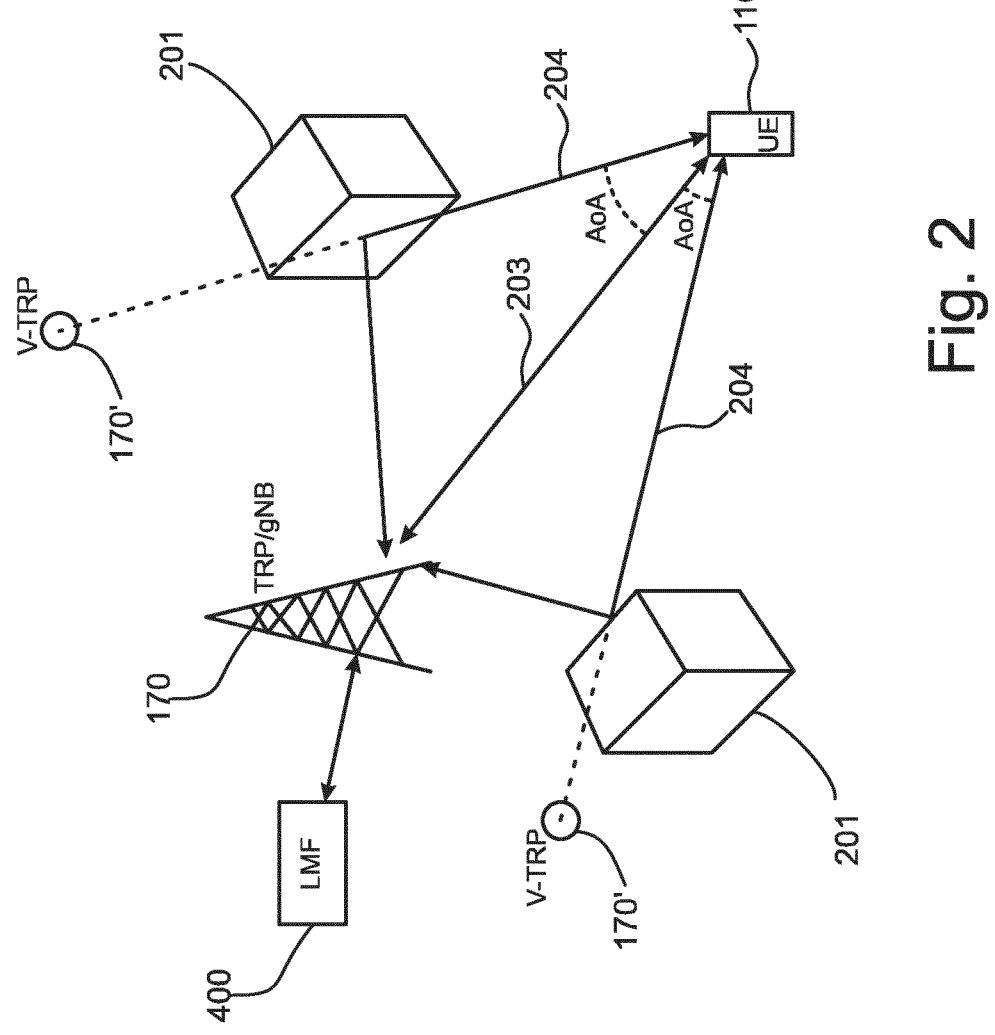
FIG. 2 illustrates an example situation in which a signal transmitted by a base station arrives at a receiving communication device as a direct line of sight signal and as signals reflected from obstacles.

FIG. 2 illustrates an example situation in which a signal transmitted by a base station 170 arrives at a receiving communication device 110 as a direct, line-of-sight (LoS) signal 203 and as signals 204 reflected from obstacles 201. In other words, the receiving communication device 110 receives the transmitted signal via multiple signal paths. In this example the signal is reflected from two buildings 201 and arrives at the receiving communication device 110 via the paths 204 illustrated in FIG. 2. In addition to reflecting signals an object may scatter a signal and also such a scattered signal may arrive at the receiving communication device 110. In this disclosure the reflected and scattered signals are also called as multipath propagated signals.

Because the reflected and scattered signals travel a longer path than the line-of-sight signal, they arrive later at the receiving communication device 110 than the line-of-sight signal but they represent the same information content. Each multipath propagated signal can be considered as a signal from a virtual transmission reception point (V-TRP) 170' and can be utilized in a UE positioning procedure. However, to do that the location of the object 201 reflecting and/or scattering the signal should be known by some accuracy in order to utilize it in the UE positioning procedure.

In view of the UE the reflected signal seems to come from the virtual transmission reception point 170' so that the distance from the UE to the virtual transmission reception point 170' is substantially equal to the length of path the reflected signal has proceeded before arriving at the location of the receiving UE 110. In other words, the virtual transmission reception point 170' is at a distance from the UE equal to the sum of distances: dist(170', 110)=dist(170, 201)+dist(201, 110). This is because the UE sees a signal coming from that direction, with a delay corresponding to traveling the sum of distances. When the location management function 400 has collected several V-TRP measurements, the location management function 400 will compute the true location of the V-TRP(s), i.e. that location corresponding to position(s) 201 in FIG. 2.

In the following, some embodiments are presented which mainly focus on the problem of unknown landmark location for positioning in multipath propagation environments so that multiple signal paths can be used in estimating UE's location.

In accordance with an embodiment of the disclosure, a signalling framework is described that enables the network to generate a map with locations of some or all virtual TRPs (V-TRP) as a by-product of the UE positioning procedure. Once localized, the V-TRPs will be used to enhance the positioning accuracy by exploiting multipath information.

In the following some further details of a hybrid positioning method according to an embodiment of the disclosure will be described, regarding downlink (DL) positioning.

In this embodiment the network, e.g. the location management function 400, computes the positions of the virtual TRPs 170' and uses the virtual TRPs as passive signal sources in the position estimation of a mobile UE. Virtually, each considered V-TRP becomes a signal source and the UE reports measurements of the signals reflected by a V-TRP, similarly to the measurements of the signals emitted by the gNBs or any other TRP. These are then used as additional data points in the overall location estimation process at the network side.

To do that, however, the network, and particularly the location management function 400, may need to acquire the locations of all relevant fixed V-TRPs. The mapping of V-TRP to a location is enabled through the method described in the following embodiments.

Figure 4:
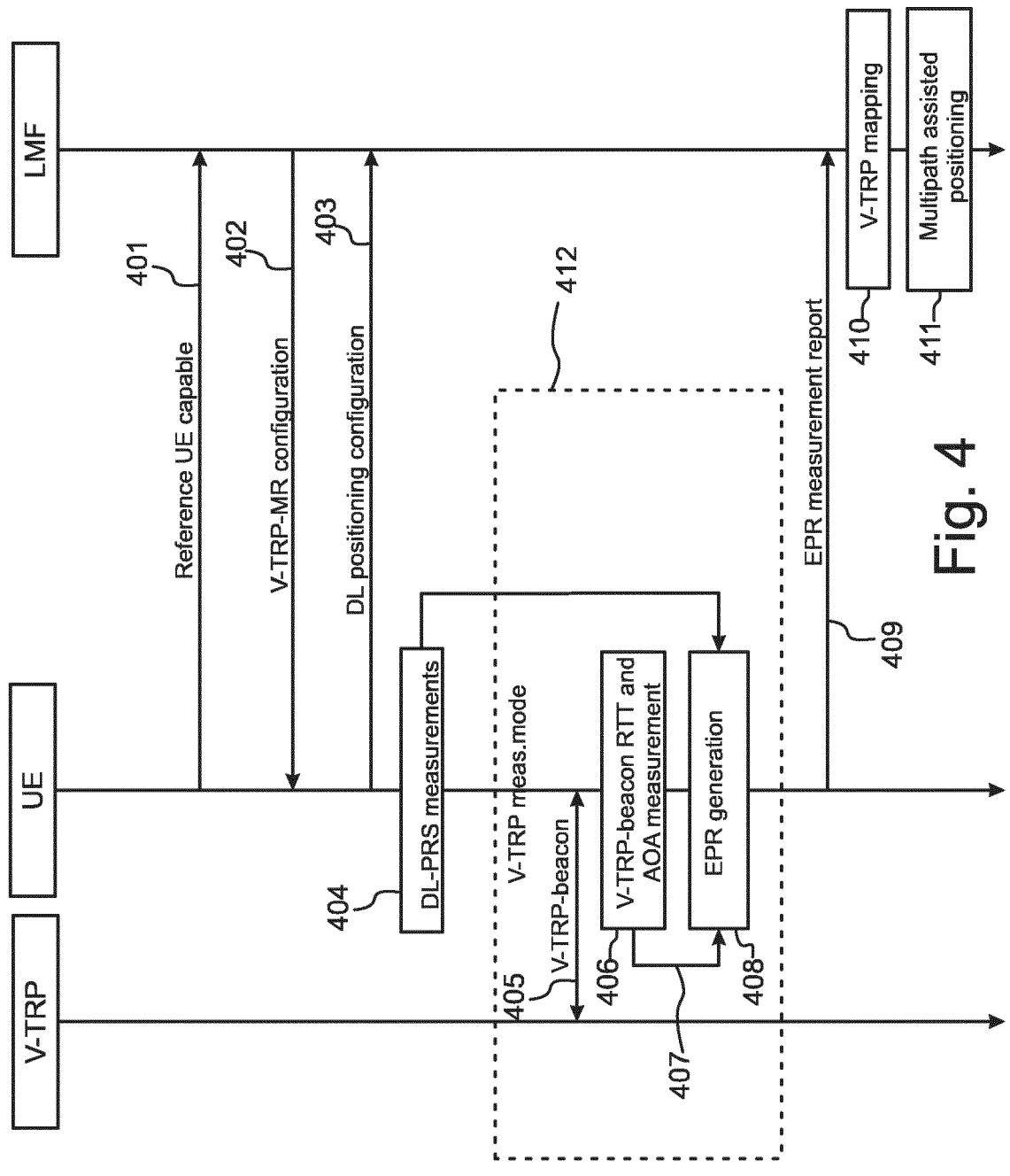
FIG. 4 shows a diagram of operations between a user equipment and a network element in a multi-TRP context, in accordance with an embodiment.

The method in accordance with an embodiment of the disclosure is depicted in FIG. 4 and will be described in the following. It is assumed that the network comprises a location management function (LMF) 400, for example in a base station 170 or in some other network element and the user equipment 110 is used as the signal receiving entity, which obtains information related to the multipath propagated signals.

The UE 110 signals to the location management function 400/the serving gNB its capability of becoming a reference UE, i.e. the capability of reporting V-TRP information (the arrow 401 in FIG. 4). For example, the UE sends a report V-TRP-ref-UE-capab, which comprises e.g. the following information:

- flagging its ability to collect V-TRP measurements V-TRP_cap=1,
- indicating its duplexing capabilities, e.g. FD=1 (supports full-duplex communication), TDD=1 (supports time-division duplexing communication), etc.
- other relevant metrics.

Figure 3:
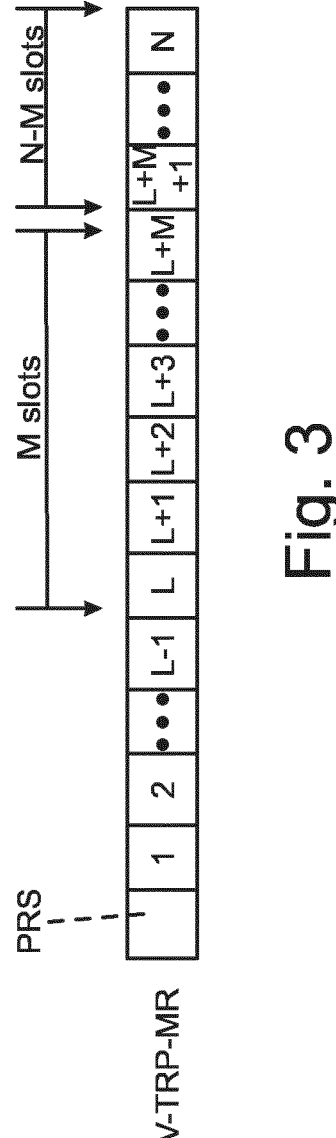
FIG. 3 illustrates an example of a virtual transmission reception point measurement resource set.

The location management function 400 responds back by selecting the UE as a reference and configuring a V-TRP measurement resource set (V-TRP-MR), illustrated in FIG. 3 in a simplified manner and generates s V-TRP configuration message in which the V-TRP-measurement resource-set is defined. The V-TRP measurement resource set V-TRP-MR can be defined as N consecutive time periods, such as time-slots, where the value of N is set by the location management function 400. The start of the V-TRP-MR is set to L time periods after the transmission of the positioning reference signal, where the value of the parameter L is selected by the network. The location management function 400 signals 402 power control settings for the V-TRP signal transmission by the UE. The location management function 400 may signal a selected signature (i.e. a generating code)

for the V-TRP signal, so that it may ensure its uniqueness in the vicinity of the UE. The V-TRP signal will be used as a V-TRP-beacon.

The setup may consist of defining at least:

- the time-frequency resources for the transmission of the V-TRP detection beacon.
- the repetition pattern, sequence of transmit and receive time periods.
- the generation code of the V-TRP beacon.
- the power control mechanism, e.g. either fixed power assuming a specific path loss model, or a dynamic power ramp up to detect V-TRP on various tiers around the UE, etc.

The location management function 400 and the user equipment 110 pair perform the positioning session including inter alia session setup, uplink/downlink positioning reference signal transmission and detection.

Then, after the setup of the V-TRP detection is established, the LMF initiates the positioning protocol (as usual positioning process) and the positioning reference signal (PRS) transmission, detection and measurement takes place.

Note that during PRS detection, the UE has measured the time/angle of arrival (TOA/AOA) of each relevant multipath component (MC):

TABLE 1

| MC detection | | | |
|---|---|---|---|
| Multipath | AOA | TOA | Power |
| MC1 | AOA(1) | TOA(1) | P(1) |
| . . . | . . . | . . . | . . . |
| MCK | AOA(K) | TOA(K) | P(K) |

In accordance with an embodiment of the disclosure, after the finalization of the PRS measurements, the following operations may be performed.

The UE activates 404 the V-TRP measurement mode for the time period (T_prs+L, T_prs+L+N). During this time period the UE generates and transmits 405 omnidirectionally a V-TRP beacon signal using the configuration messages for the V-TRP-measurement resource-set in M<N time periods s. It should be noted that the beacon transmission time periods may not necessarily be consecutive.

The UE listens in the remaining (N-M) time periods for a half-duplex implementation, or the UE simultaneously listens for a full-duplex implementation the reflected signal and measures 406 inter alia the time of arrival (TOA), the angle of arrival (AOA), the received signal received power (RSRP), etc. Table 2 illustrates an example of such measurement results in tabular form.

TABLE 2

| V-TRP detection at UE | | | |
|---|---|---|---|
| V-TRP | TOA | AOA | Power |
| V-TRP i | vTOA(i) | vAOA(i) | vP(i) |

The UE filters the measurements above and stores, for example, only those for which the accuracy is above a threshold. For example, it may decide to store only the values for which the RSSP is above a minimum set value.

Next, the V-TRP measurements from Table 2 are matched to the multipath components detected with the PRS and stored in Table 1. The merging of the two tables is realized by e.g. a common AOA/a similar AOA, e.g. |AOA(k)−vAOA(i)|<threshold.

The UE merges 407 the V-TRP measurement results with the positioning reference signal measurements by a common angle of arrival AOA and appends 408 the result to a positioning report.

Hence, to finalize the V-TRP measurement mode 412, the UE generates and sends back an enhanced positioning report (EPR) by merging information illustrated in Table 1 and Table 2 by a common AOA and filtering for relevant power:

TABLE 3

| EPR generation | | | | |
| --- | --- | --- | --- | --- |
| MC | V-TRP | AOA | TOA | Power |
| MC a | V-TRPx | commonAOA | [TOA(a), vTOA(x)] | [P(a), vP(x)] |

The UE 110 transmits 409 an enhanced measurement report (EPR) to the location management function 400.

Figure 5:
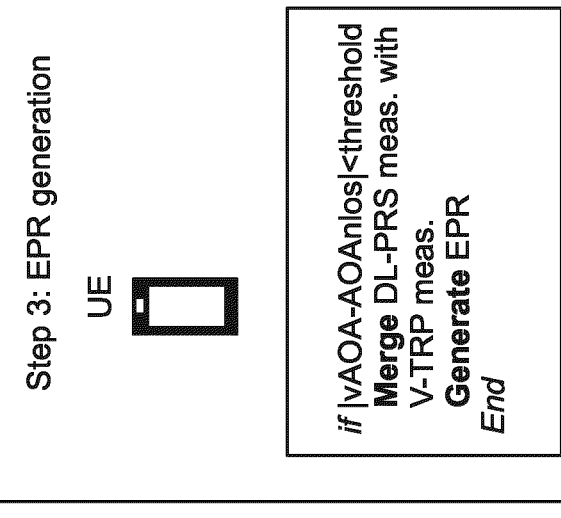
FIG. 5 shows an example of how an embodiment may operate, in accordance with an embodiment.
Figure 5:
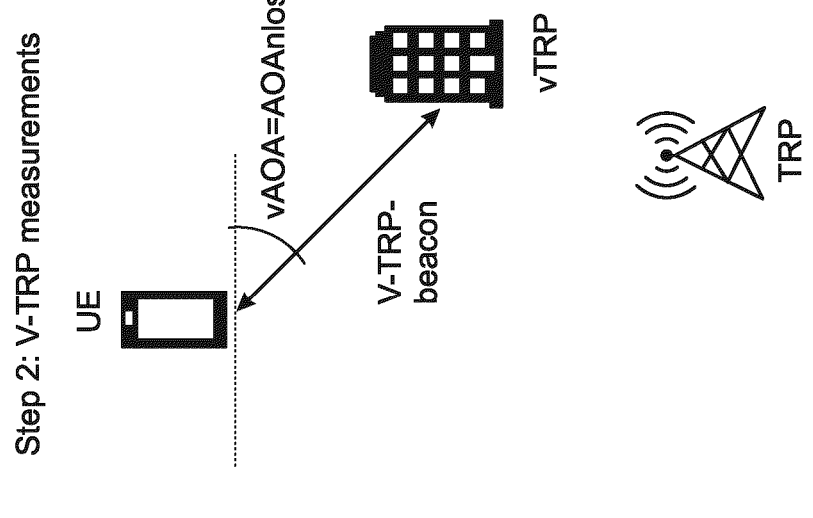
Figure 5:
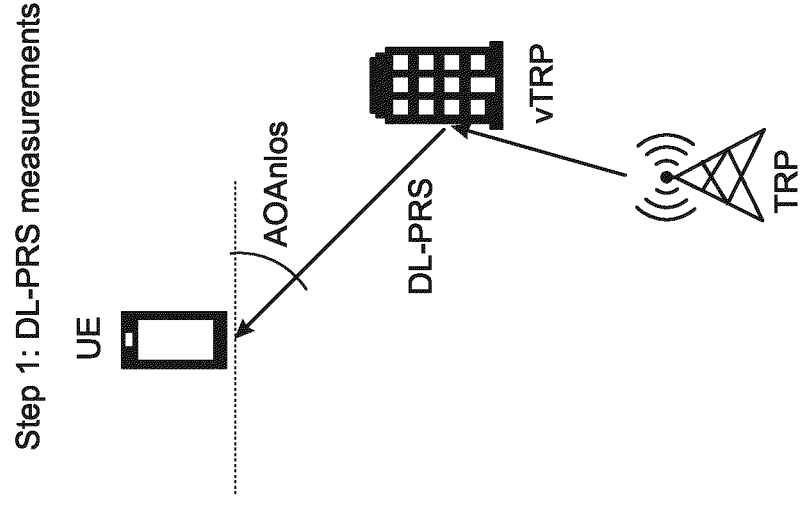

The operation presented above is also depicted in FIG. 5.

The location management function 400 receives the enhanced measurement report (EPR) containing measurements of all relevant TRP and V-TRP measurements. The location management function 400 combines 410 the enhanced measurement reports collected from several reference UEs and estimates 411 the V-TRP locations by means of data association algorithms a mapping of V-TRP to a location on the map that corresponds to a fixed landmark.

In accordance with another embodiment related to uplink (UL) positioning, the method may be applied as follows:

The UE sends the report V-TRP-ref-UE-capab and the location management function 400 answers with the configuration of V-TRP-measurement resource-set. The location management function 400 initiates the process for uplink positioning, where the UE transmits UL SRS which are measured by the RAN (particularly, the gNB or TRP nodes) and reported to the LMF.

Upon finishing the transmission of UL SRS for positioning, the UE triggers the V-TRP measurements mode as described in the above DL embodiment.

The UE generates and sends a report containing Table 2 and finalizes the V-TRP detection.

The LMF combines the SRS measurement reports obtained from the gNB/TRPs with the UE report (i.e., the information of Table 2) to generate by means of data association algorithms a mapping of V-TRP to a location on the map that corresponds to a fixed landmark.

The solutions presented above may allow the estimation of the location of fixed reflectors, which facilitates the UE position estimation using multiple multipath components per base station or transmission reception point (TRP). The following benefits may be seen from various viewpoints:

Measuring multiple sources coming from reflecting landmarks V-TRPs of positioning signals increases the positioning accuracy.

Such reflecting sources are typically in the vicinity of the UE, hence this method assists in accurately estimating the locations of the reflecting landmarks.

The method provides fallback measurements in case the line-of-site LoS signal is lost or not available at all, thereby increasing the integrity levels (equivalently, it may reduce the probability of integrity loss). In other words, it may relax the dependency on LoS signals at the UE, and may increase the robustness of positioning.

The creation of a V-TRP map at the location management function 400 can be used for obstacle identification, not only for positioning but also for other purposes as well (i.a., Automated guided vehicles (AGV) route map creation and live update).

Figure 6:
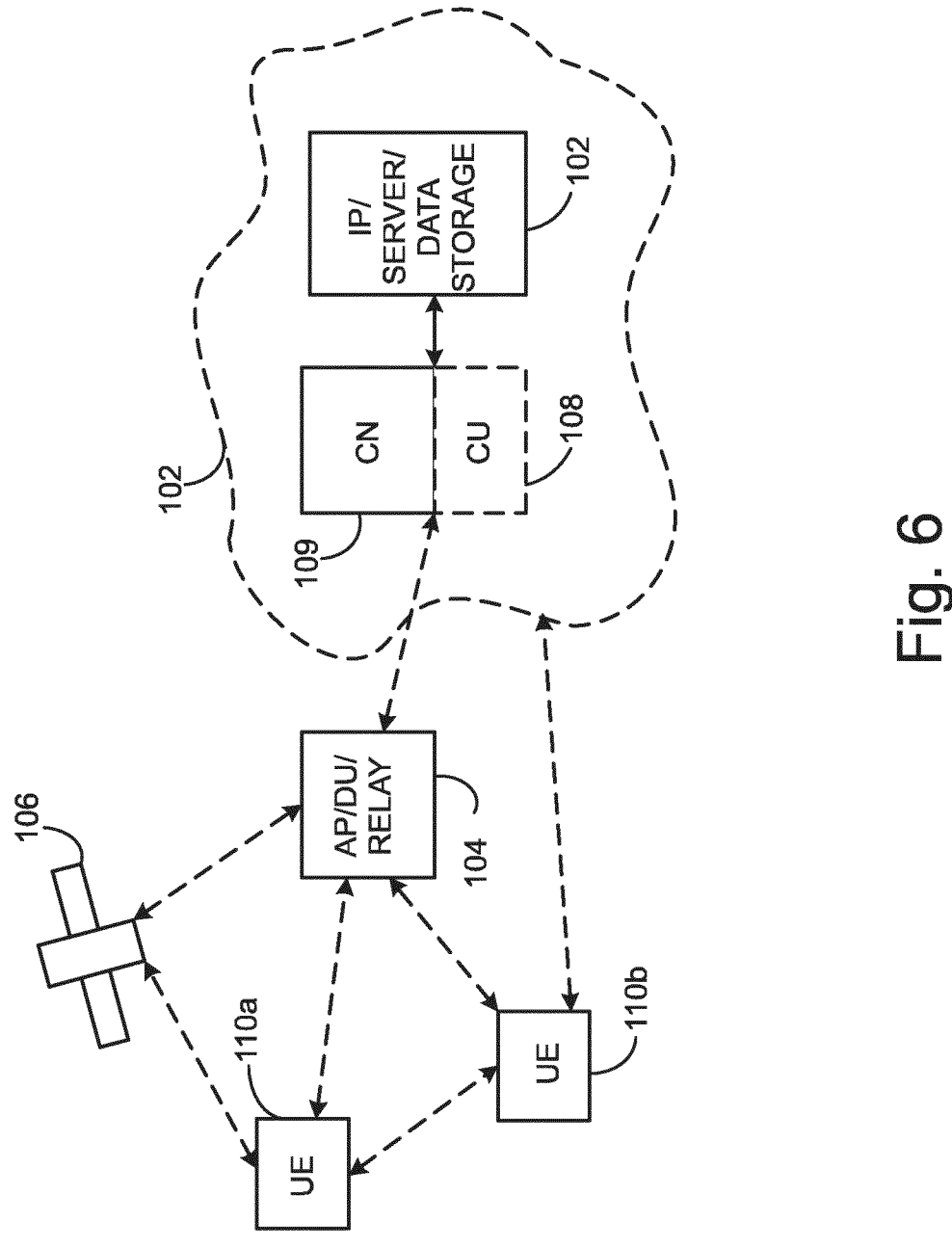
FIG. 6 shows a part of an exemplifying wireless communications access network in accordance with at least some embodiments.

FIG. 6 depicts examples of simplified system architectures only showing some elements and functional entities, all being logical units, whose implementation may differ from what is shown. The connections shown in FIG. 6 are logical connections; the actual physical connections may be different. It is apparent to a person skilled in the art that the system typically comprises also other functions and structures than those shown in FIG. 6.

The embodiments are not, however, restricted to the system given as an example but a person skilled in the art may apply the solution to other communication systems provided with necessary properties.

The example of FIG. 6 shows a part of an exemplifying radio access network.

FIG. 6 shows user equipments 110a and 110b configured to be in a wireless connection on one or more communication channels in a cell with an access node (such as (e/g) NodeB) 104 providing the cell. The physical link from a user equipment to a (e/g)NodeB is called uplink (UL) or reverse link and the physical link from the (e/g)NodeB to the user equipment is called downlink (DL) or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to as management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 6) may be implemented. 5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network.

The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 6 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 6 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 6). A HNB Gateway (HNB-GW), which is typically installed within an operator's network may aggregate traffic from a large number of HNBs back to a core network.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In the following, a list of acronyms used in this specification are provided:

3GPP—3rd Generation Partnership Project
4G-LTE—Long Term Evolution
5G—5th Generation
AGV Automated Guided Vehicle
AMF—Access and Mobility Management Function
AOA Angle of Arrival
eNB—Evolved NodeB
gNB—5G/NR Base Station
BS Base station
CN—Core Network
CU—Central Unit
CPS—Cyber Physical System
DCI—Downlink Control Information
DL—Downlink
DSP—Digital Signal Processor
DU—Distributed Unit
EPR—Enhanced Positioning Report
FPGA—Field-programmable gate array
GEO—Geostationary Earth Orbit
HNB-GW—Home Node B Gateway
IoT—Internet of Things
LEO—Low Earth Orbit
LMC—Location Management Component
LMF—Location Management Function
LOS—Line of Sight
M2M—Machine-to-Machine
MC Multipath Component
MEC—Multi-Access Edge Computing
MIMO—Multiple Input-Multiple Output
MME—Mobility Management Entity
mMTC—(massive) Machine-type Communications
MR Measurement Resource
MS—Mobile Station
NFV—Network Function Virtualization
NGC—Next Generation Core
NLOS—Non-Line of Sight
NR—New Radio
PDA—Personal Digital Assistant
PDSCH—Physical Downlink Shared Channel
PRS Positioning Reference Signals
PUCCH—Physical Uplink Control Channel
PUSCH—Physical Uplink Shared Channel
RAN—Radio Access Network
RRC—Radio Resource Control
RRH—Remote Radio Head
RTT Round Trip Time
RU—Radio Unit
S-DCI—single-DCI
SDM—Spatial Division Multiplexing
SDN—Software Defined Networking
SFN—Single Frequency Network
SGW—Serving Gateway
SIM—Subscriber Identification Module
SMF—Session Management Function
SPS—Semi Persistent Scheduling
SRS—Sounding Reference Signal
TB—Transport Block
TDM—Time Division Multiplexing
TDOA—Time Difference of Arrival
TOA—Time of Arrival
TRP—Transmission Reception Point
UCI—Uplink Control Information
UE—User Equipment
UL—Uplink
UMTS—Universal Mobile Telecommunications System UPF—User Plane Function
URLLC—Ultra-Reliable Low-Latency Communication
eURLLC—Enhanced URLLC
UTRAN—UMTS Radio Access Network
UWB—Ultra Wideband
V-TRP Virtual Transmission/Reception Point
WCDMA—Wideband Code Division Multiple Access
WiMAX—Worldwide interoperability for Microwave Access The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A network element, comprising:
at least one processor; and
at least one non-transitory memory storing instructions that, when executed with the at least one processor, cause the network element to perform:
receiving from one or more user equipment an indication that the user equipment is capable to report information about a virtual transmission reception point related to a wireless communication system;
configuring a measurement resource set for virtual transmission reception point;
informing the one or more user equipment about the measurement resource set;
receiving from the one or more user equipment an enhanced measurement report containing measurements of signals received from one or more transmission reception points and virtual transmission reception points;
combining several enhanced measurement reports received from one or more user equipment; and
estimating locations of the one or more virtual transmission reception points on the basis of the combined enhanced measurement reports.

2. The network element according to claim 1 wherein the instructions, when executed with the at least one processor, cause the network element to perform:
initiating a positioning operation with the one or more user equipment, and
transmitting a positioning reference signal to the one or more user equipment.

3. The network element according to claim 1 wherein the instructions, when executed with the at least one processor, cause the network element to perform:
initiating a positioning operation with the one or more user equipment, and
receiving a sounding reference signal from the one or more user equipment.

4. The network element according to claim 1, said configuring a measurement resource set for virtual transmission reception point comprising one or more of the following:
time-frequency resources for the transmission of a virtual transmission reception point detection beacon;
a repetition pattern;
a sequence of transmit and receive time periods;
a generation code of a virtual transmission reception point beacon signal; or a power control mechanism for the virtual transmission reception point beacon signal transmission with the one or more user equipment.

5. The network element according to claim 4, wherein the sequence of transmit and receive time periods defines:

a first time period for positioning reference signal transmission with the transmission reception point;

a second time period for transmission of the virtual transmission reception point beacon signal with the one or more user equipment; and a third time period for listening and detecting reflections of the virtual transmission reception point beacon signal with the one or more user equipment.

6. A method comprising:

receiving from one or more user equipment an indication that the user equipment is capable to report information about a virtual transmission reception point related to a wireless communication system;

configuring a measurement resource set for virtual transmission reception point;

informing the one or more user equipment about the measurement resource set;

receiving from the one or more user equipment an enhanced measurement report containing measurements of signals received from one or more transmission reception points and virtual transmission reception points;

combining several enhanced measurement reports received from one or more user equipment; and estimating locations of the one or more virtual transmission reception points on the basis of the combined enhanced measurement reports.

7. The method according to claim 6 further comprising one or both of the following:

initiating a positioning operation with the one or more user equipment, and transmitting a positioning reference signal to the one or more user equipment; or initiating a positioning operation with the one or more user equipment, and receiving a sounding reference signal from the one or more user equipment.

8. The method according to claim 6 comprising configuring the measurement resource set for virtual transmission reception point to include one or more of the following:

time-frequency resources for the transmission of a virtual transmission reception point detection beacon;

a repetition pattern;

a sequence of transmit and receive time periods;

a generation code of a virtual transmission reception point beacon signal; or a power control mechanism for the virtual transmission reception point beacon signal transmission with the one or more user equipment.

9. The method according to claim 8 comprising defining:

a first time period for positioning reference signal transmission with the transmission reception point;

a second time period for transmission of the virtual transmission reception point beacon signal with the one or more user equipment; and a third time period for listening and detecting reflections of the virtual transmission reception point beacon signal with the one or more user equipment.

10. A user equipment, comprising:

at least one processor; and at least one non-transitory memory storing instructions that, when executed with the at least one processor, cause the user equipment to perform:

sending an indication to a network element that the user equipment is capable to report information about a virtual transmission reception point related to a wireless communication system;

receiving information about a measurement resource set from the network element;

detecting and measuring positioning reference signals transmitted with the network element;

generating a virtual transmission reception point beacon signal using the received information about the measurement resource set;

transmitting the virtual transmission reception point beacon signal during a time period determined in the measurement resource set;

listening for a reflected beacon signal;

measuring one or more properties of the reflected signal;

merging the measurement results with the positioning reference signal measurements;

generating a measurement report based on the merged measurement results; and transmitting the measurement report to the network element.

11. The user equipment according to claim 10 wherein the instructions, when executed with the at least one processor, cause the user equipment to perform transmitting the virtual transmission reception point beacon signal.

12. The user equipment according to claim 10, wherein the instructions, when executed with the at least one processor, cause the user to equipment to perform merging the measurement results with the positioning reference signal measurements using such measurements which are above a predetermined threshold.

13. The user equipment according to claim 10, wherein the instructions, when executed with the at least one processor, cause the user equipment to perform measuring one or more properties of the reflected signal to measure one or more of the following:

time of arrival;

angle of arrival; or received signal received power.

14. A method, comprising:

sending an indication to a network element that the user equipment is capable to report information about a virtual transmission reception point related to a wireless communication system;

receiving information about a measurement resource set from the network element;

detecting and measuring positioning reference signals transmitted with the network element;

generating a virtual transmission reception point beacon signal using the received information about the measurement resource set;

transmitting the virtual transmission reception point beacon signal during a time period determined in the measurement resource set;

listening for a reflected beacon signal;

measuring one or more properties of the reflected signal;

merging the measurement results with the positioning reference signal measurements;

generating a measurement report based on the merged measurement results; and transmitting the measurement report to the network element.

15. The method according to claim 14 further comprising:
transmitting the virtual transmission reception point bea-
con signal.

16. The method according to claim 14 comprising:
merging such measurements which are above a predeter-
mined threshold.

17. The method according to claim 14, comprising mea-
suring one or more of the following properties of the
reflected signal:
time of arrival;
angle of arrival; or
received signal received power.

* * * * *